(12) United States Patent
Robins et al.

(10) Patent No.: US 6,329,029 B1
(45) Date of Patent: Dec. 11, 2001

(54) VEHICLE INTERIOR HAND GRIP MATERIAL

(76) Inventors: James F. Robins, 4921 W. 81st. Pl., Apt. 1F, Westminster, CO (US) 80031; Greg K. Mock, 1292 Idalia Ct., Aurora, CO (US) 80011

( * ) Notice: Subject to any disclaimer, the term of this patent is extended or adjusted under 35 U.S.C. 154(b) by 0 days.

(21) Appl. No.: 09/569,336

(22) Filed: May 11, 2000

Related U.S. Application Data

(60) Provisional application No. 60/133,809, filed on May 11, 1999.

(51) Int. Cl.[7] .................................................. B60R 13/100
(52) U.S. Cl. .................. 428/31; 428/4; 428/11; 428/63; 428/101; 428/102; 428/131; 428/193; 74/491; 74/551.8; 74/551.9; 74/552; 74/558
(58) Field of Search ..................................... 428/101, 102, 428/137, 63, 31, 193, 4, 11, 131; 74/558, 491, 558.5, 552, 551.8, 551.9, 543; 2/20; D12/177, 100, 144, 178; 180/315; 16/110 R, 125; 280/288.4

(56) References Cited

U.S. PATENT DOCUMENTS

| | | | |
|---|---|---|---|
| D. 414,722 | * | 10/2000 | Hamowy .............................. D12/114 |
| 2,121,963 | * | 6/1938 | Goit . |
| 2,506,197 | * | 5/1950 | Burger . |
| 5,134,008 | * | 7/1992 | Alm . |

* cited by examiner

Primary Examiner—Deborah Jones
Assistant Examiner—Abraham Bahta
(74) Attorney, Agent, or Firm—Edwin H. Crabtree; Ramon L. Pizzaro; Donald W. Maugolis

(57) ABSTRACT

A vehicle interior hand grip material for mounting on an existing gear shift lever arm, on a portion of a steering wheel and other items operated by hand inside a vehicle. The hand grip material includes a plurality of flexible "string like" elastomeric members extending outwardly from an attachment member. The attachment member may be a thin wire wrapped around a portion of the elastomeric members and tightened thereon. Also, the attachment member may be a liner with one end of the elastomeric members attached to the liner. The wire attachment member can be secured around a gear shift threaded housing threaded on an end of the vehicle's gear shift lever arm. Also, the wire attachment member can be attached to other hand operated items inside the vehicle. Further, the steering wheel liner attachment member can be placed around a portion of the vehicle's steering wheel. The elastomeric members are designed to give an operator of a vehicle a unique experience in feel, appearance and texture when gripping the elastomeric members by hand. Also, the uses of the hand grip material on the gear shift and the steering wheel provide for greater control of the vehicle when operating the gear shift lever arm and steering wheel.

7 Claims, 2 Drawing Sheets

VEHICLE INTERIOR HAND GRIP MATERIAL

This application is based on an earlier filed provisional application having Ser. No. 60/133,809, filed on May 11, 1999, and having a title of "VEHICLE GEAR SHIFT KNOB AND STEERING WHEEL COVER" by the subject inventors.

BACKGROUND OF THE INVENTION (a) Field of the Invention

This invention relates to vehicle accessories and more specifically, but not by way of limitation, to hand grip material used for covering one end of vehicle gear shift, a steering wheel and other items handled inside a vehicle.

(b) Discussion of Prior Art

Heretofore, there have been a variety of different types of gear shift knobs and steering wheel covers. Various steering wheel covers are disclosed in U.S. Pat. No. Des. 280,314 to Strongwater and U.S. Pat. No. 4,441,382 to Snooks, U.S. Pat. No. 4,800,776 to Strongwater, U.S. Pat. No. 5,207,713 to Park, U.S. Pat. No. 5,042,318 to Franz, U.S. Pat. No. 5,393,298 to Chang, U.S. Pat. No. 5,327,799 to Lin and U.S. Pat. No. 5,743,154 to Jacinth.

None of the prior art steering wheel covers and gear shift knobs provide the unique features and structure of the subject invention as described herein.

SUMMARY OF THE INVENTION

In view of the foregoing, it is a primary object of the subject invention to provide a vehicle interior hand grip material which is unique in appearance, different in feel and texture when attached to the end of a gear shift lever arm, around a portion of a steering wheel and on other items that are operated by hand inside the vehicle.

Another advantage of the subject invention is the hand grip material can be quickly attached to the end of a gear shift and removed when desired. Also, the hand grip material can be quickly attached to a portion of a steering wheel and removed when desired. Further, the hand grip material may be an OEM item from the vehicle manufacture or it may be supplied as an after market product.

Yet another object of the invention is by the nature of the elastomeric material used in the hand grip material, the grip on the gear shift and steering wheel is greatly improved for maintaining control of the vehicle during its operation.

The hand grip material includes a plurality of flexible "string like" elastomeric members extending outwardly from an attachment member. The attachment member may be a thin wire wrapped around a portion of the elastomeric members and tightened thereon. Also, the attachment member may be a liner with one end of the elastomeric members attached to the liner. The wire attachment member can be secured around a gear shift threaded housing threaded on an end of the vehicle's gear shift lever arm. Also, the wire attachment member can be attached to other hand operated items inside the vehicle. Further, the steering wheel liner attachment member can be placed around a portion of the vehicle's steering wheel. The elastomeric members are designed to give an operator of a vehicle a unique experience in feel, appearance and texture when gripping the elastomeric members by hand. Also, the uses of the hand grip material on the gear shift and the steering wheel provide for greater control of the vehicle when operating the gear shift lever arm and steering wheel.

These and other objects of the present invention will become apparent to those familiar with the different types of vehicle accessories when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
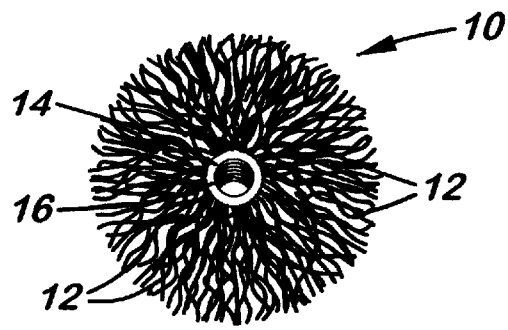
FIG. 1 is a bottom view of the vehicle interior hand grip material mounted on a threaded housing. The threaded housing used for threading the one end of a gear shift lever arm.

In FIG. 1, a bottom view of the vehicle interior hand grip material is shown having general reference numeral 10. The hand grip material 10 includes a plurality of flexible "string like" elastomeric members 12 extending from a threaded housing 14 having internal threads 16. The flexible "string like" elastomeric members 12 having a length in a range of ¼ to 4 inches and greater. The housing 14 and threads 16 are used for releasably engaging an upper end of gear shift lever arm 18. The lever arm 18 is shown in FIGS. 3 and 4.

Figure 1A:
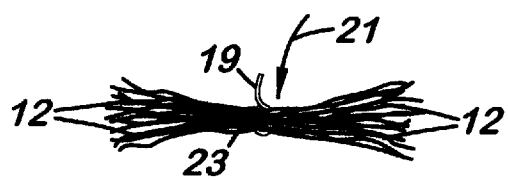
FIG. 1A is a front view of a thin wire used as an attachment member for the hand grip material. A portion of the thin wire is received around a center portion of a bundle of flexible "string like" elastomeric members.

In FIG. 1A, the elastomeric members 12 are shown with a thin wire 19 received around a center portion 23 of the members 12 and tightened thereon as indicated by arrow 21. When the center portion 23 of the members 12 is tightened and compressed, the ends of the members 12 radiate outwardly as shown in the drawings and formed into a "ball" shaped configuration. Also, while the thin wire 19 is shown, a clamp and other types of similar attachment devices can be used equally well for tightening and compressing the elastomeric members 12.

Figure 2:
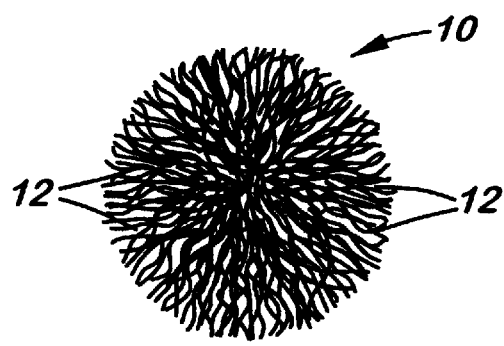
FIG. 2 is a side view of the hand grip material used for mounting on the end of the gear shift lever arm. The hand grip material formed into a "ball" shaped configuration.

In FIG. 2, a side view of the hand grip material 10 is shown with the elastomeric members 12 radiating outwardly from the threaded housing 14.

Figure 3:
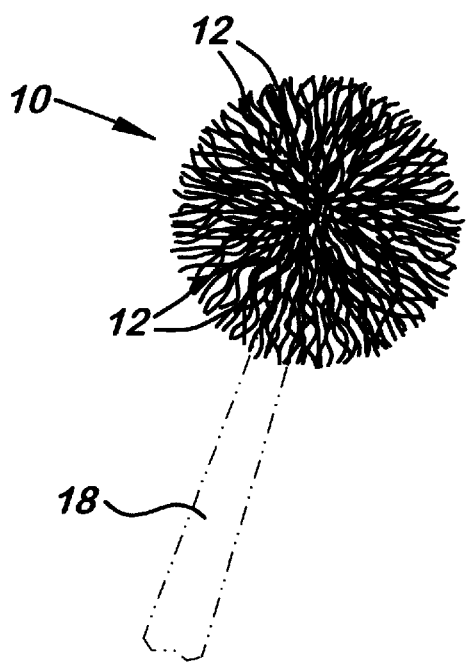
FIG. 3 is a perspective view of the hand grip material mounted on one end of the gear shift lever arm.
Figure 4:
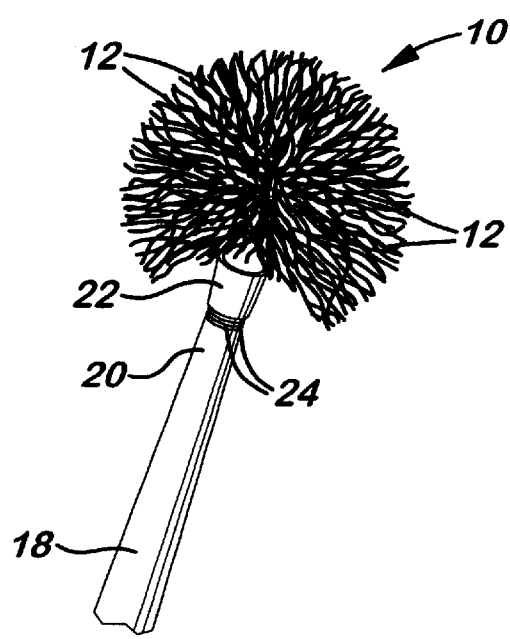
FIG. 4 is a perspective view similar to the hand grip material shown in FIG. 3, but with a portion of the flexible elastomeric members cut-away to expose an extended threaded housing used for securing the hand grip material on top of the gear shift lever arm.

In FIG. 3, a perspective view of the hand grip material 10 is illustrated and mounted on an upper end 20 of the gear shift lever arm 18.

In FIG. 4, another perspective view of the hand grip material 10 is shown but with a portion of the elastomeric members 12 cut-away to expose an enlarged and extended threaded housing 22. The threaded housing 22 is also used for securing the hand grip material 10 to external threads 24 on top of the gear shift lever arm 18.

Figure 5:
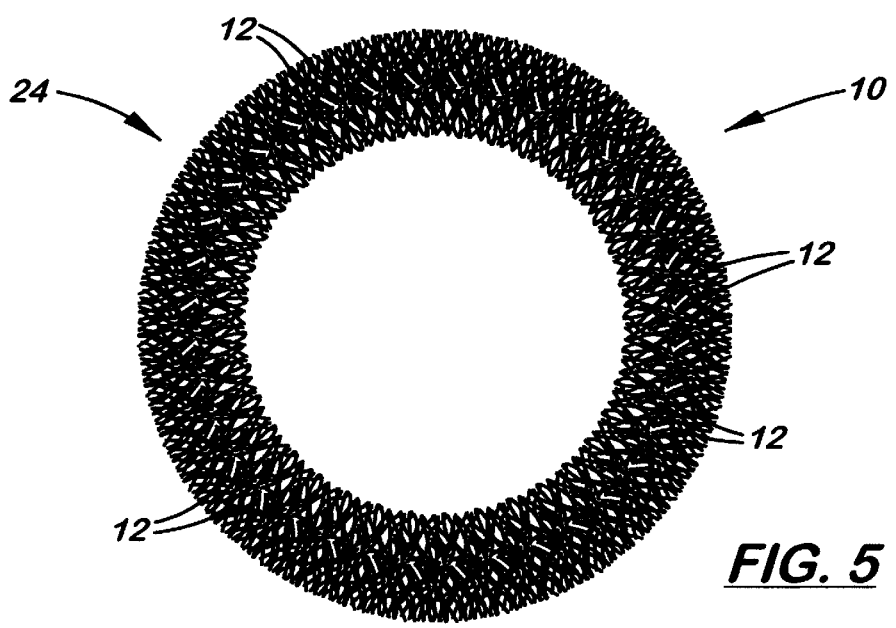
FIG. 5 is a front view of the hand grip material formed into a "circular" hand grip configuration for receipt on a vehicle steering wheel.

In FIG. 5, a front view of the hand grip material 10 is shown formed into a circular hand grip 24, having general reference numeral 24, for receipt on a vehicle steering wheel.

Figure 6:
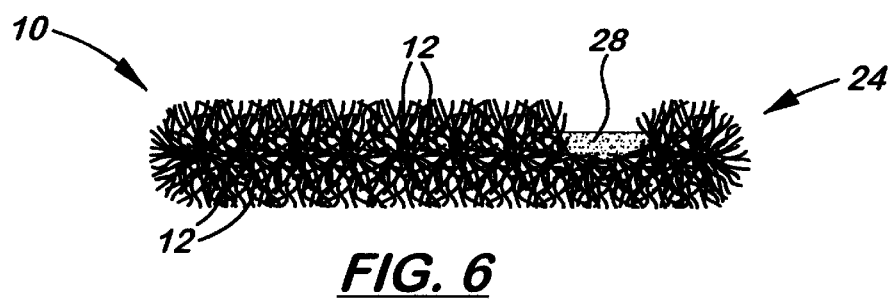
FIG. 6 is a side view of the hand grip material used for receipt on the steering wheel. A portion of the flexible elastomeric members have been cut-away to expose a liner used for attaching one end of the elastomeric members.

In FIG. 6, a side view of the hand grip material 10 formed into a circular hand grip 24 is shown. A portion of the flexible elastomeric members 12 have been cut-away to expose an interior liner 26. The liner 26 is used for attaching one end of the elastomeric members 12. Also, the members 12 can be threaded through a portion of the liner with the liner 26 dividing the length of each member 12. The elastomeric members 12 are secured around the circumference of the interior liner 28 and tightened thereon in a similar fashion as described under FIGS. 1 and 1A.

Figure 7:
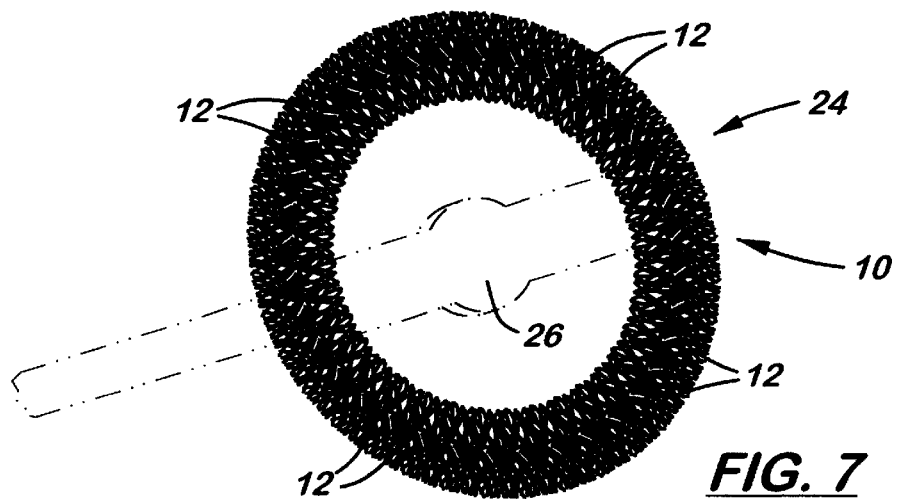
FIG. 7 is a perspective view of the circular hand grip mounted on a portion of a steering wheel.

In FIG. 7, a perspective view of the circular hand grip 24 is shown releasably mounted on a portion of a steering wheel 26.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A vehicle interior hand grip material used inside a vehicle, the hand grip material comprising:

a plurality of long narrow flexible elastomeric members, said elastomeric members stretchable along their length, said elastomeric members having a length in a range of ¼ to 4 inches; and attachment means for engaging a center portion of said elastomeric members, said attachment means adapted for mounting on a vehicle gear shift lever arm inside the vehicle;

whereby when said attachment means is tightened on said elastomeric members and compressed thereagainst, ends of said elastomeric members radiate outwardly forming a ball shaped configuration.

2. The hand grip material as described in claim 1 wherein said attachment means is a thin wire used for receipt around the center portion of said elastomeric members and tightened thereon.

3. The hand grip material as described in claim 1 wherein said attachment means is a clamp used for receipt around the center portion of said elastomeric members and tightened thereon.

4. A vehicle interior hand grip material used inside a vehicle, the hand grip material comprising:

a plurality of parallel long narrow flexible elastomeric members, said elastomeric members disposed next to each other along a length thereof;

a thin wire used for receipt around a center portion of said elastomeric members and tightened thereon; and a threaded housing, said thin wire secured to said threaded housing, said threaded housing adapted for mounting on a vehicle gear shift lever arm;

whereby when said thin wire is tightened on said elastomeric members and compressed thereagainst, ends of said elastomeric members radiate outwardly forming a ball shaped configuration.

5. The hand grip material as described in claim 4 wherein said elastomeric members have a length in a range of ¼ to 4 inches.

6. A vehicle interior hand grip material used inside a vehicle, the hand grip material comprising:

a plurality of long narrow flexible elastomeric members, said elastomeric members having a length in a range of ¼ to 4 inches; and attachment means for engaging and securing one end of said elastomeric members thereon, whereby said elastomeric members mounted on said attachment means are formed into a circular configuration and adapted for receipt on a portion of a vehicle steering wheel.

7. The hand grip material as described in claim 6 wherein said attachment means is an interior liner, one end of said elastomeric members attached to said interior liner.

* * * * *